United States Patent
Geisse et al.

(10) Patent No.: US 6,659,212 B2
(45) Date of Patent: Dec. 9, 2003

(54) HYBRID DRIVE FOR A MOTOR VEHICLE WITH AN EXHAUST GAS TURBOCHARGER

(75) Inventors: Dietmar Geisse, Stuttgart (DE); Karl-Ernst Noreikat, Esslingen (DE); Alfons Rennefeld, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/849,251

(22) Filed: May 7, 2001

(65) Prior Publication Data

US 2002/0003053 A1 Jan. 10, 2002

(30) Foreign Application Priority Data

May 6, 2000 (DE) .......................................... 100 22 113

(51) Int. Cl.[7] .................................................. B60K 6/00
(52) U.S. Cl. ..................... 180/65.2; 180/302; 60/608
(58) Field of Search ................. 180/65.2, 302; 60/608

(56) References Cited

U.S. PATENT DOCUMENTS

| | | | | |
|---|---|---|---|---|
| 4,680,933 A | * | 7/1987 | Bozung et al. ............. 290/52 |
| 4,769,993 A | * | 9/1988 | Kawamura ................. 290/52 |
| 4,774,811 A | * | 10/1988 | Kawamura ................. 60/608 |
| 4,798,257 A | * | 1/1989 | Kawamura et al. ......... 180/165 |
| 4,955,199 A | * | 9/1990 | Kawamura ................. 60/608 |
| 5,038,566 A | * | 8/1991 | Hara ........................ 60/607 |
| 5,306,997 A | * | 4/1994 | Akiyama .................. 318/721 |
| 5,406,797 A | * | 4/1995 | Kawamura ................. 290/52 |
| 5,560,208 A | * | 10/1996 | Halimi et al. ............... 60/600 |
| 5,678,407 A | * | 10/1997 | Hara ........................ 60/608 |
| 5,713,425 A | | 2/1998 | Buschhaus et al. ........ 180/65.2 |
| 5,857,336 A | * | 1/1999 | Paul et al. .................. 60/597 |
| 5,881,559 A | * | 3/1999 | Kawamura ............... 123/192.2 |
| 6,029,452 A | * | 2/2000 | Halimi et al. .............. 123/565 |
| 6,338,391 B1 | * | 1/2002 | Severinsky et al. ........ 180/65.2 |
| 6,570,265 B1 | * | 5/2003 | Shiraishi et al. .......... 290/40 C |

FOREIGN PATENT DOCUMENTS

| | | |
|---|---|---|
| DE | 35 42 059 C1 | 11/1985 |
| DE | 40 04 330 C2 | 2/1990 |
| DE | 41 24 479 A1 | 7/1991 |
| DE | 44 07 666 A1 | 3/1994 |
| DE | 196 00 252 A1 | 1/1996 |
| EP | 0 141 634 A2 | 10/1984 |
| EP | 0 223 119 B1 | 1/1990 |
| EP | 0352063 | 1/1990 |
| EP | 0 233 079 B1 | 9/1991 |
| JP | 0090163505 AA | 12/1995 |
| JP | 0100252517 AA | 3/1997 |

OTHER PUBLICATIONS

"Fachkunde Kraftfahrzeugtechnik" (Specialist motor vehicle technology information) 26th Edition, 1999, Europa No. 20108, ISBN 3–8085–2066–3, p. 376.

* cited by examiner

Primary Examiner—Paul N. Dickson
Assistant Examiner—Laura B. Rosenberg
(74) Attorney, Agent, or Firm—Crowell & Moring LLP

(57) ABSTRACT

In a hybrid drive for a vehicle, an exhaust gas turbocharger is coupled to an electrical machine. The machine is actuated by an electronic control device to limit the supercharge pressure of the exhaust gas turbocharger.

7 Claims, 1 Drawing Sheet

HYBRID DRIVE FOR A MOTOR VEHICLE WITH AN EXHAUST GAS TURBOCHARGER

BACKGROUND AND SUMMARY OF THE INVENTION

This application claims the priority of German patent document 100 22 113.0, filed May 6, 2000, the disclosure of which is expressly incorporated by reference herein.

The invention relates to a hybrid drive for a motor vehicle having both an internal combustion engine and at least one electric machine as propulsion units.

In addition to the internal combustion engine and the at least one electrical machine, a hybrid drive includes at least one first electrical accumulator which electrically couples the electric machine to an electrical energy supply; an electronic control device automatically operates the at least one electric machine as an electric motor, which is fed with electricity from the accumulator, or as an electric generator for supplying current to the accumulator, as a function of predetermined operating conditions of the motor vehicle.

A hybrid drive of this type disclosed in German patent document DE 196 00 252 A1 contains an exhaust gas turbogenerator for recovering exhaust gas energy, which is used to generate electrical energy. The internal combustion engine can be provided with mechanical supercharging.

"Mechanical supercharging" takes place by means of a supercharger which is mechanically driven, for example directly from the internal combustion engine via an electrically actuated magnetic clutch, as is known from the specialist book "Fachkunde Kraftfahrzeugtechnik" (Specialist motor vehicle technology information) 26$^{th}$ Edition, 1999, Europa No. 20108, ISBN 3-8085-2066-3, Page 376.

In hybrid drives, electrical machines serving as vehicle drive sources can be connected in series or in parallel with the internal combustion engine, in order to support the drive power of the latter or to drive the motor vehicle independently of the internal combustion engine. It is known, for example, for the internal combustion engine to drive the wheels of one vehicle axle, while a plurality of electrical machines drive the wheels of another vehicle axle. The electrical machines can also be operated, alternatively, as generators for electricity generation; for this purpose, they can be driven by the vehicle wheels and/or by the internal combustion engine, depending on the embodiment. In order to retard the motor vehicle, it is therefore possible to use not only the vehicle brakes but also the internal combustion engine and the electrical machines. Hybrid drives are, for example, known from U.S. Pat. No. 5,713,425 and German patent documents DE 40 04 330 C2, DE 44 07 666 A1, DE 35 42 059 C1 and DE 41 24 479 A1.

Internal combustion engines with exhaust gas turbochargers and an electrical machine which can be driven by the exhaust gas turbocharger for electricity generation are known from European patent documents EP 0 141 634 A2, and EP 0 223 119 B1, and Japanese patent documents JP 0090163505 AA and JP 0100252517 AA.

One object of the present invention is to simplify hybrid drives of the type mentioned at the beginning.

Another object of the invention is to make such drives more cost-effective.

Still another object of the invention is to increase the efficiency of such drives.

These and other objects and advantages are achieved by the hybrid drive according to the invention, in which at least one exhaust gas turbocharger for the delivery of fresh gas to the internal combustion engine is provided via at least one second electrical machine, which can be operated as an electrical generator. The electric machine is also connected for drive purposes to the rotor of the exhaust gas turbocharger, which is electrically coupled to the accumulator for current supply and to the control device for control purposes. The control device is configured to regulate the supercharge pressure of the internal combustion engine as a function of predetermined operating conditions, and limits the supercharge pressure of the fresh gas generated by the exhaust gas turbocharger by regulating the electrical power of the at least one second electrical machine.

This configuration provides the following advantages: First, it simplifies the hybrid drive, in particular because no bypass valves are necessary on the exhaust gas turbocharger to avoid excessive internal combustion engine supercharge pressures. Also, the electrical machine of the exhaust gas turbocharger can be controlled, in a simple manner by way of open or closed loop control, by the same control device which controls the at least one electrical machine that serves as a vehicle drive source.

Furthermore, the efficiency of the hybrid drive is improved because the electrical accumulator is always optimally charged. This is because the first electrical machine, which serves as a vehicle drive source, generates current during vehicle deceleration procedures and the second electrical machine driven by the exhaust gas turbocharger always generates particularly large amounts of current at a time offset to the above when the internal combustion engine is rotating at high speed. The first electrical machine or the second electrical machine therefore supplement each other in an optimum manner. There is, therefore, always sufficient electrical power available from the accumulator for the at least one first electrical machine that serves as the vehicle drive source, even in the case of a stop-and-go driving operation in the city. Thus, the motor vehicle can be driven away in each case, without using the internal combustion engine, and with only the at least one first electrical machine as the electrical vehicle drive motor, without danger of the electrical accumulator's being excessively depleted. In the present case, electrical accumulator means any electrical storage unit, in particular batteries and capacitors.

Limiting the supercharge pressure of the exhaust gas turbocharger, by maintaining the rotational speed of the turbine at high output in generator operation, permits a recovery of energy which can then be fed in-phase to the electrical vehicle drive unit or made available to the accumulator.

The at least one second electric machine can preferably be operated not only as a generator but also as an electric motor; and the control device for its operation as a motor is configured as a function of predetermined operating conditions. In consequence, the exhaust gas turbocharger can be driven in the lower rotational speed range, when only a little exhaust gas (or exhaust gas energy) is available, by the second electrical machine acting as an electric motor. In addition, so-called "turbolag" can be avoided by the second electrical machine, operated as a motor, accelerating the turbocharger when the latter cannot follow rapid changes in the accelerator pedal positions because of a lack of sufficient exhaust gases or exhaust gas energy. For this purpose, the accelerator pedal is electrically coupled to the control device so that the latter can accelerate the second electrical machine (and therefore the exhaust gas turbocharger) in the case of sudden changes to the accelerator pedal position.

The at least one second electrical machine, operated as a generator, can supply the on-board network of the motor vehicle with electricity.

According to a preferred embodiment of the invention, a drive direct current network is provided to which the accumulator is connected and to which the at least one first electric machine and the at least one second electric machine are each connected by means of a power electronics circuit. The power electronics circuit inverts the DC voltage of the accumulator into an AC voltage required by the electrical machines; and, vice versa, it converts an AC voltage generated by these electrical machines into a DC voltage for the accumulator.

According to a likewise preferred embodiment of the invention, the accumulator (and therefore also the drive direct current network) has an electrical DC voltage of at least 100 V, preferably an electrical DC voltage in the range between 200 V and 350 V. Compared with a now usual lower voltage such, for example, as 6 V, 12 V or 24 V, the substantially higher voltage has the advantage that the electrical currents are substantially lower for the same electrical power. This leads to a distinct reduction in the electrical current heat losses in the lines, components and units and, in consequence, to an improvement in the overall efficiency.

In consequence, smaller electronic components can also be used for the power electronics for transmitting electrical power and for converting direct current into alternating current and vice versa. More highly powered electric machines can therefore also be used. The electric machines are preferably three-phase alternating current machines.

Other objects, advantages and novel features of the present invention will become apparent from the following detailed description of the invention when considered in conjunction with the accompanying drawings.

DETAILED DESCRIPTION OF THE DRAWINGS

Figure 1:
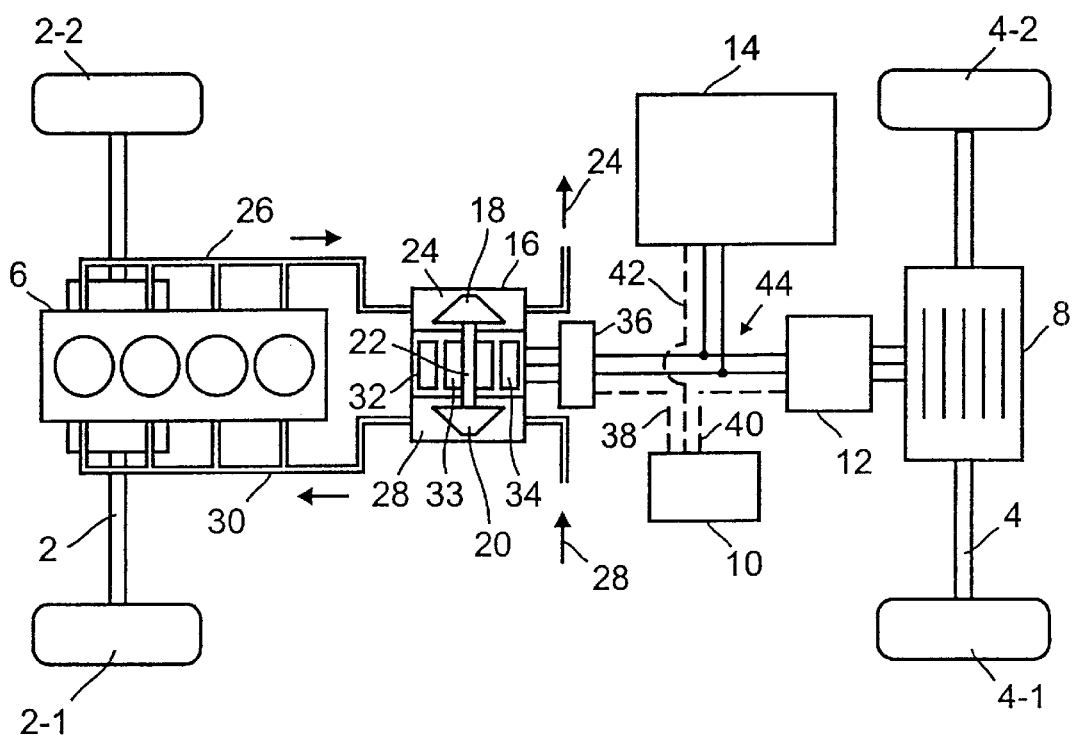
FIG. 1 shows, diagrammatically, a plan view of a hybrid drive for a motor vehicle according to the invention.

In FIG. 1, a motor vehicle has a front axle 2, with front wheels 2-1 and 2-2, and a rear axle 4, with rear wheels 4-1 and 4-2. The front wheels 2-1 and 2-2 can be driven by an internal combustion engine 6 and the rear wheels 4-1 and 4-2 can be driven by a first electrical machine 8, which can be operated by an electronic control device 10 alternatively as an electric motor or as a generator for generating current. In generator operation, it is driven by the rear wheels 4-1 and 4-2. The internal combustion engine 6 and the first electrical machine 8 therefore form the vehicle drive sources for the motor vehicle. (Instead of a first electrical machine 8, a plurality of first electrical machines 8 can also be provided. Also according to a different embodiment, the internal combustion engine 6 can drive the rear wheels 4-1 and 4-2 and the first electrical machine 8 can drive the front wheels 2-1 and 2-2 or both vehicle drive sources 6 and 8 can drive the same wheels.)

The first electrical machine 8 is preferably a three-phase alternating current machine and is connected by means of power electronics 12 to an electrical accumulator 14. The latter is a capacitor or, preferably, a battery. The power electronics 12 contain a converter for converting the direct current of the accumulator 14 into the AC voltage necessary for driving the first electrical machine 8 and, vice versa, for converting the AC voltage of this electric machine 8 into the DC voltage of the accumulator 14.

An exhaust gas turbocharger 16 has a turbine wheel 18 and a compressor impeller 20, which are connected together by a shaft 22 to ensure joint rotation. The turbine wheel 18 is driven by the exhaust gases 24 of an exhaust gas conduit 26 of the internal combustion engine 6. The compressor impeller 20 takes in fresh gas 28 (fresh air) and supplies it, in compressed condition, through a fresh gas conduit 30 to the combustion chambers of the internal combustion engine 6.

In the embodiment shown in FIG. 1, only one exhaust gas turbocharger 16 is provided for all the combustion chambers or cylinders of the internal combustion engine 6. In a different embodiment, each combustion chamber or a group of combustion chambers may of course be provided with its own exhaust gas turbocharger.

A second electrical machine 32 is connected for drive purposes to the rotor or the shaft 22 of the exhaust gas turbocharger 16. In the embodiment of FIG. 1, the shaft 22 of the exhaust gas turbocharger 16 extends axially through the second electrical machine 32 and the rotor 33 of this second electrical machine is connected for drive purposes to the shaft 22. In one embodiment, the rotor 33 is seated on the shaft 22. The stator 34 of the second electrical machine (also preferably configured as a three-phase alternating current machine) is connected by means of a power electronics circuit 36 to the electrical accumulator 14 and, for control purposes, to the electronic control device 10. During generator operation, this power electronics circuit 36 converts the alternating voltage of the second electrical machine 32 into the direct voltage of the accumulator 14 and, in the case of motor operation of the second electrical machine 32, it converts the DC voltage of the accumulator 14 into the AC voltage necessary for the second electrical machine.

The control lines 38 and 40 of the control device 10 to the two power electronics circuits 36 and 12 are shown by dashed lines. A control line 42 indicates the respective charge condition of the accumulator 14 to the control device 10.

In a preferred embodiment, monitoring electronics are integrated into the accumulator 14. The control line 42 records and regulates, in interaction with the monitoring electronics, the charge which can be taken as a function of the operating condition of the accumulator 14.

The electric connecting lines between the accumulator 14 and the two power electronics circuits 12 and 36 form a drive direct current network 44. The DC voltage of the accumulator 14, and therefore also of this drive direct current network 44, is preferably at least 100 V and a preferred range is, in particular, between 200 V and 350 V and within this range, in turn, a range between 250 V and 300 V.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid drive for a motor vehicle comprising:
    an internal combustion engine and at least one first electrical machine as vehicle drive sources;
    at least one first electrical accumulator which is electrically coupled to the at least one first electrical machine as an electrical energy supply;
    an electronic control device, which automatically operates the at least one first electrical machine as an electric motor or as an electric generator as a function of predetermined operating conditions of the motor vehicle;

at least one exhaust gas turbocharger which generates supercharge pressure for delivering fresh gas to the internal combustion engine;

at least one second electrical machine, which is operable as a generator and is connected to drive a shaft of the exhaust gas turbocharger, said at least one second electrical machine being electrically coupled to supply current to the accumulator, and connected for control purposes to the electronic control device;

wherein the electronic control device is configured to prevent the supercharge pressure generated by the exhaust gas turbocharger and input to the internal combustion engine from exceeding an operating limit, as a function of predetermined operating conditions, by regulating electrical power output of the at least one second electrical machine.

2. The hybrid drive according to claim 1, wherein the control device is configured to operate the at least one second electrical machine not only as a generator, but also as an electric motor for driving the exhaust gas turbocharger.

3. The hybrid drive according to claim 1, wherein:
the accumulator is connected to a drive direct current network;
the first and second electrical machines are respectively connected to the drive direct current network by means of power electronics.

4. The hybrid drive according to claim 3, wherein the accumulator and the drive direct current network have an electrical DC voltage of at least 100 V.

5. The hybrid drive according to claim 4, wherein the electrical DC voltage is within the range of 200 V and 350 V.

6. The hybrid drive according to claim 1, wherein at least one of the electrical machines is a three-phase alternating current machine.

7. A method of avoiding excessive internal combustion engine supercharge pressure in a hybrid drive for a motor vehicle having an internal combustion engine and at least one first electrical machine as vehicle drive sources; at least one first electrical accumulator which is electrically coupled to the at least one first electrical machine as an electrical energy supply; an electronic control device, which automatically operates the at least one first electrical machine as an electric motor or as an electric generator as a function of predetermined operating conditions of the motor vehicle; at least one exhaust gas turbocharger which generates supercharge pressure for delivering fresh gas to the internal combustion engine; at least one second electrical machine, which is operable as a generator and is connected to drive a shaft of the exhaust gas turbocharger, said at least one second electrical machine being electrically coupled to supply current to the accumulator, and connected for control purposes to the electronic control device, said method comprising:

said electronic control device preventing said supercharge pressure of said at least one exhaust gas turbocharger from exceeding an operating limit as a function of predetermined operating conditions, by regulating an electric power output of the at least one second electrical machine.

* * * * *